(12) United States Patent
Lewis et al.

(10) Patent No.: US 10,459,670 B2
(45) Date of Patent: Oct. 29, 2019

(54) METHODS, SYSTEMS, APPARATUSES AND DEVICES FOR FACILITATING PRINTING OF A DIGITAL IMAGE BASED ON IMAGE SPLITTING

(71) Applicant: Lucid Dream Software, Inc., Hoffman Estates, IL (US)

(72) Inventors: David R. Lewis, Hoffman Estates, IL (US); Aleksei Gurev, Moscow (RU)

(73) Assignee: Lucid Dream Software, Inc., Hoffman Estates, IL (US)

( * ) Notice: Subject to any disclaimer, the term of this patent is extended or adjusted under 35 U.S.C. 154(b) by 0 days.

(21) Appl. No.: 16/247,087

(22) Filed: Jan. 14, 2019

(65) Prior Publication Data

US 2019/0220234 A1 Jul. 18, 2019

Related U.S. Application Data

(60) Provisional application No. 62/617,377, filed on Jan. 15, 2018.

(51) Int. Cl.
G06K 15/02 (2006.01)
G06F 3/12 (2006.01)

(52) U.S. Cl.
CPC .......... *G06F 3/1242* (2013.01); *G06F 3/1208* (2013.01); *G06F 3/1285* (2013.01); *G06K 15/1822* (2013.01); *G06K 15/1868* (2013.01); *G06K 15/1886* (2013.01); *G06K 15/1889* (2013.01)

(58) Field of Classification Search
None
See application file for complete search history.

(56) References Cited

U.S. PATENT DOCUMENTS

| | | | |
|---|---|---|---|
| 8,804,189 B2* | 8/2014 | Kai | G06F 3/125 358/1.15 |
| 9,142,030 B2* | 9/2015 | Fei | G06T 7/149 |
| 9,805,331 B2* | 10/2017 | Hsu | G06Q 10/087 |
| 2011/0075220 A1* | 3/2011 | Chiba | G06K 9/2081 358/2.1 |
| 2012/0128248 A1* | 5/2012 | Hamada | G06K 9/34 382/173 |
| 2016/0011834 A1* | 1/2016 | Hama | G06F 3/1208 358/1.15 |
| 2017/0187915 A1* | 6/2017 | Baba | G06K 15/1827 |
| 2018/0165047 A1* | 6/2018 | Nishio | G06F 3/1243 |

\* cited by examiner

Primary Examiner — Dung D Tran

(57) ABSTRACT

A method of facilitating printing of a digital image based on image splitting is disclosed. The method may include receiving, using a communication device, the digital image from a user device. Further, the method may include analyzing, using a processing device, the digital image. Further, the method may include determining, using the processing device, at least one image characteristic based on the analyzing of the digital image. Further, the method may include generating, using the processing device, a plurality of image segments based on the at least one image characteristic. Further, the method may include storing, using a storage device, the plurality of image segments. Further, the method may include transmitting, using the communication device, the plurality of image segments to the user device.

13 Claims, 13 Drawing Sheets

METHODS, SYSTEMS, APPARATUSES AND DEVICES FOR FACILITATING PRINTING OF A DIGITAL IMAGE BASED ON IMAGE SPLITTING

The current application claims a priority to the U.S. Provisional Patent application Ser. No. 62/617,377 filed on Jan. 15, 2018.

FIELD OF THE INVENTION

The present invention relates generally to the field of data processing. More specifically, the present disclosure relates to methods, systems, apparatuses and devices for facilitating printing of a digital image based on image splitting.

BACKGROUND OF THE INVENTION

For various applications, designs need to be applied to various substrates using thermal heat transfer methods, such as decorating a wide range of surfaces. For example, T-Shirts are often decorated using heat applied transfers. The designs are either digitally printed or screen printed to a transfer media as mirror images and then heat is applied to the final substrate.

Typical application of printed thermal heat transfers is achieved using a variety of print methods such as digital electrostatic laser printers or inkjet printers, and analog methods such as manual screen printing. However, these known methods have a limited print size. Therefore, the design is limited to a maximum printable size.

Further, conventional image tiling which produces rectangular segments from the original image with a slight overlap, results in straight line seams that are easily visible and result in objectionable artifacts. Even if these tiled segments are aligned with no overlap, there is a very high occurrence of visible seams that are objectionable to the human eye. Further, simple edge-based segmentation used in existing technologies do not provide a solution for cases where large solid areas having no edges must be split.

The ability to print and transfer a design that is larger than the printable area of any given print method is highly desirable. There is a high demand for the ability to process larger digital image designs to produce segmented transfers which can be seamlessly applied with no artifacts. Therefore, there is a need for improved methods, systems, apparatuses and devices for facilitating printing of a digital image based on image splitting that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

A method of facilitating printing of a digital image based on image splitting is disclosed. The method may include receiving, using a communication device, the digital image from a user device. Further, the method may include analyzing, using a processing device, the digital image. Further, the method may include determining, using the processing device, at least one image characteristic based on the analyzing of the digital image. Further, the method may include generating, using the processing device, a plurality of image segments based on the at least one image characteristic. Further, the method may include storing, using a storage device, the plurality of image segments. Further, the method may include transmitting, using the communication device, the plurality of image segments to the user device.

Also disclosed is a system for facilitating printing of a digital image based on image splitting. The system may include a communication device configured for receiving the digital image from a user device. Further, the communication device may be configured for transmitting a plurality of image segments to the user device. Further, the system may include a processing device configured for analyzing the digital image. Further, the processing device may be configured for determining at least one image characteristic based on the analyzing of the digital image. Further, the processing device may be configured for generating the plurality of image segments based on the at least one image characteristic. Further, the system may include a storage device configured for storing the plurality of image segments.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
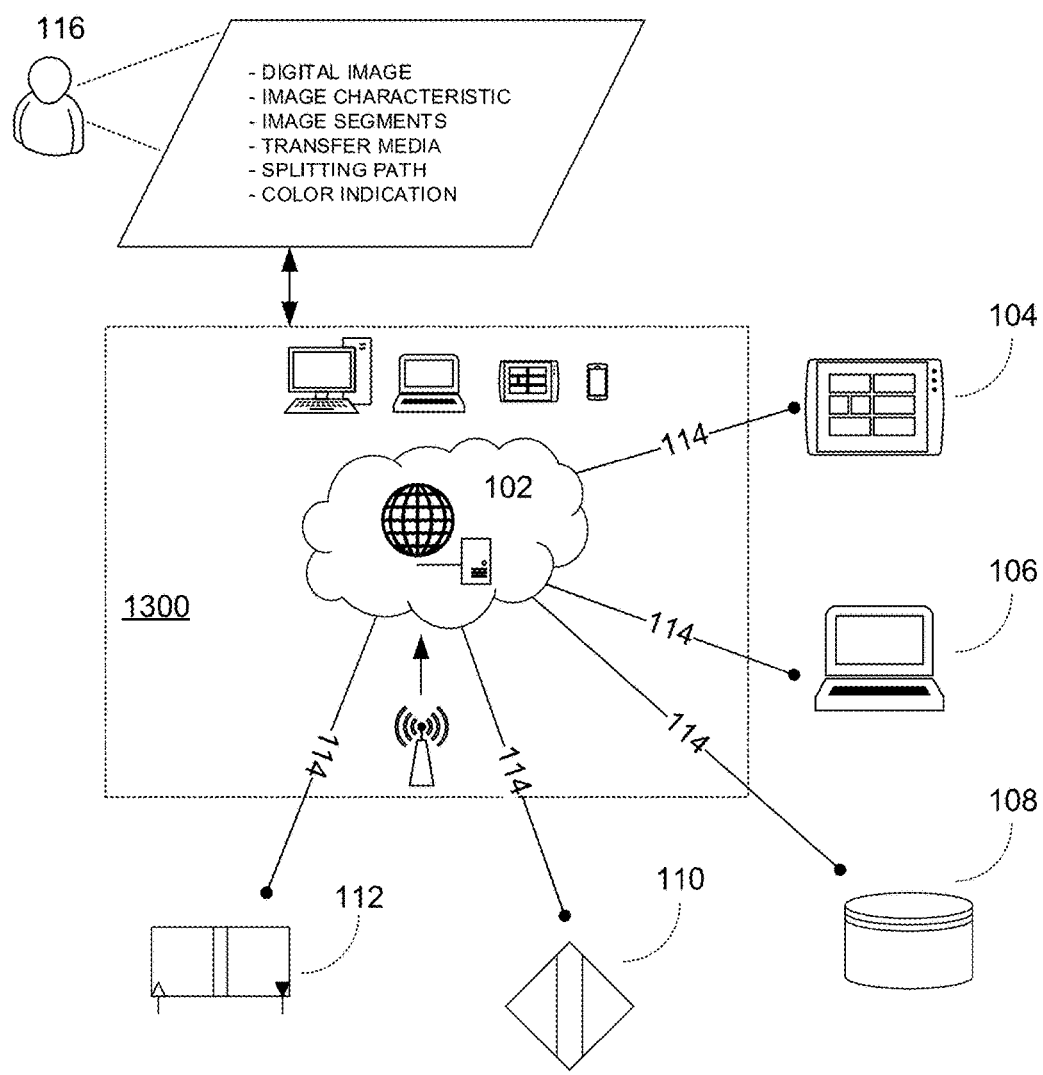
FIG. 1 illustrates an online platform configured for facilitating printing of a digital image based on image splitting, in accordance with some embodiments.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of printing of a digital image based on image splitting, embodiments of the present disclosure are not limited to use only in this context.

Overview

According to some embodiments, a method and system for applying a digitally printed image to a target substrate is disclosed. The image may be printed as a series of sub-images that are created from the original image based on edge detection analysis and non-printing background colors. The system receives user information regarding the image to be printed, the correct final print size, and the correct orientation. The system receives information from the user about the placement of printable areas such that a common zone is established within which the image is to be divided and the indication of non-printing colors in the image. The system may then process the image to detect natural edges within the image along with non-printing colors and will divide the image into sub-images. Further, the sub-images may be printed onto transparent or translucent media and then transferred to the target substrate one after the other using visual alignment such that there are no artifacts or visual clues that any seams might exist.

According to some embodiments, a method and process is provided for printing a large digital image onto a substrate comprising smaller image segments achieved by image analysis and optionally image masking to create an irregular split path to divide the larger image into smaller sections which are then reassembled onto the substrate in a seamless result using a translucent transfer media.

According to some embodiments, the present disclosure relates to a method and system whereby a user may utilize a computing machine to load and display an image of a design to be made into a final print design. The user may establish a final desired size of the print design and select the actual printable area of the printing device utilizing controls in a user interface. The user may specify the placement of a multitude of printable area designators in such a fashion that they overlap. Further, the disclosed system may be configured for performing image masking, image analysis, edge detection, applying masking pattern, analyzing, comparing and selecting the most appropriate placement of a splitting path along the various edges, colors, contours and shapes in the overlap zone.

Further, the disclosed system may display to the user the path selected and allow the user to save the resulting segments or to go back and modify settings and try again.

Further, the system may be configured for utilizing a translucent aspect of common print transfer media to enable the user to visually align these segmented images and apply them to the final desired application.

In an exemplary embodiment, a computerized software may be provided that may enable a user to select a large image and divide it into smaller segments, which may be then split along the various edges. Then, the smaller segments may be printed onto a translucent transfer media. One of the printed sheets may be then heat applied to a substrate and the sheet is removed. Then the next and subsequent sheet(s) may be visually aligned into the correct position using the transparent nature of the print media. Once aligned, the heat may be applied. After all sheets are transferred to the substrate, a heat application with a pressing sheet may blend the final design into a seamless single design.

According to some embodiments, the present disclosure provides a method and system for decorating a wide variety of substrates with a digitally printed image that is larger than the available printable area provided by the target printing device.

The disclosed method may include displaying an image. This may include displaying one or more of the digital representation of the image contents, the orientation of the image for optimized sub segment printing, the final print sizing of the image, the designation of non-printing colors, the designation of an overlapping zone and a visualization of the separation zone between image segments.

Further, the disclosed method may include analyzing the image using standard edge detection techniques, wherein these edges can then be used to plot a path to divide the original image into sub-image components such that when the components are reassembled the split portions are sufficiently hidden in these edges so as to not cause any visually discernible artifacts or seams.

Further, the disclosed method may include designating one or more background colors and/or one or more transparent colors that are non-printing colors wherein the split portions are hidden in these non-printing colors so as to not cause any visually discernible artifacts or seams.

Further, the method may include separating the original image data into multiple sub-images that contain the correct sub-image areas and fit onto the correct printable size. The separating may further include writing image pixels from one side of an edge into one sub-image file and writing image pixels from the opposite side of the edge into the second or subsequent image file. Moreover, the separating may include writing image pixels from one side of a selected point in the non-printing color into one sub-image file and writing image pixels from the opposite side of the selected point in the non-printing color into the second or subsequent image file.

Further, the method may include designating an original image as one that has previously been processed as a masked or screened image with a uniform pattern encompassing both printing and non-printing areas. Further, sub-image segments may be created by plotting a splitting path that always follows the non-printing areas.

Further, the analyzing may include producing an edges map and the image to apply a uniform screening or raster masking function to create printing and nonprinting areas. Further, it may include processing the resulting image into sub-images by plotting a splitting line that has a preference for edges that falls into the non-printing areas.

Further, the method may include displaying the resulting sub-images for verification and acceptance by the system user.

Further, the method may include printing the sub-images using a transparent or translucent material to create a multitude of prints that can be visually aligned. This may also include applying heat using common transfer methods.

Further, the method may include repeatedly applying the visually aligned printed sheets using the transparent nature of the sheets to recreate the entire original design in a seamless fashion.

Further, the disclosed system may enable a user to select and process the digital file so it is displayed and correctly sized and oriented for print production. The user may then designate the position of visual markers that represent the printable media size in a fashion to create an overlap zone, such that portions of the image in this zone will print on one sheet of the media and other portions will print on the other sheet as later defined.

In an embodiment, the system may then process the larger image using a common edge detection algorithm such as the Canny Edge Detection Method. This analysis may produce a representation of the colors, contours, and edges found inside the digital image contents.

In an embodiment, the system may then process a splitting path from one side of the image to the opposite side by analyzing the image data and the edge data looking for either the background image color or image edges in such a fashion that the splitting line does not cross itself and is as short as possible while trying to avoid crossing through any non-edge everywhere possible.

As the splitting path is obtained, the system may then display a preview of the image segments to allow the user to accept or revert the results. Upon reverting, the splitting path may be discarded and the original image may be redisplayed. Upon accepting, the original image may be split and saved as two or more image segment files in the designated format required for digital printing.

The user may then print the multiple image segments representing the split parts of the original image onto a transparent or translucent sheet. This is typically printed as a mirror reflected version.

The first translucent sheet may be then applied to the desired substrate using conventional transfer methods. Both sheets may be used to inspect the correct positioning and then one sheet at a time may be applied.

After standard application of the previous sheet then the next sheet may be visually aligned so that the image data edges are directly adjacent to the previously applied images by peering through the translucent or transparent media. Further, alignment may be done such that there is no overlap and image edges keep the same appearance as the original.

The subsequent sheets may be then applied in this progressive fashion until the entire original image is recreated in a seamless fashion on the desired substrate.

In another embodiment, the system may be configured to process the original image using a masking pattern whose contents may consist of any arrangement of light and dark pixels such that the image data is converted into what is commonly known as a screened or masked form, where the mask pattern has been used to break up the image to create a digital structure of alternating image content areas (dots or lines) and non-printing background transparent color.

Further, the system may be configured to then analyze the above-referenced image in a fashion to process a splitting path from one side of the image to the opposite side by traversing through the non-printing background color only.

Further, the original image may be of a form where the image data has been converted into what is commonly known as a screened or rasterized form, where a type of digital screen mesh has been used to break up the image to create a digital structure of alternating image content areas (dots or lines) and non-printing background transparent color.

Further, the system may be configured to then analyze the above-referenced image data in a fashion to selectively include these printable shapes (dots or lines) in either one image segment or the next. The inclusion may be determined in a number of ways, for example, random selection of one side or the next, blending method, or some numerical function.

In an embodiment, the split images may be digitally printed on a transparent or translucent media which may then be visually aligned and then transferred to the final substrate.

In another embodiment, the split images may be digitally printed on any opaque media with intention to apply to a transparent or translucent substrate. The media may be visually positioned by peering through the substrate. For example, the split images may be printed to a paper type of print media which may be then to be applied to a transparent substrate such as glass. The first sheet may be applied and then the second sheet may be aligned by looking through the glass.

In another embodiment, the split images may be digitally printed on any media with an exact registration system. The sheets may be then applied using a registration system to insure exact placement during application. Such a registration system might use special marks printed outside the image area for alignment or any type of digital or a manual alignment method.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

FIG. 1 is an illustration of an online platform 100 consistent with various embodiments of the present disclosure. By way of non-limiting example, the online platform 100 to facilitate printing of a digital image based on image splitting may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and sensors 110 and actuators 112 over a communication network 114, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web-based software application or browser. The web-based software application may be embodied as, for example, but not be limited to, a website, a web application, a desktop application, and a mobile application compatible with a computing device 1300.

Figure 2:
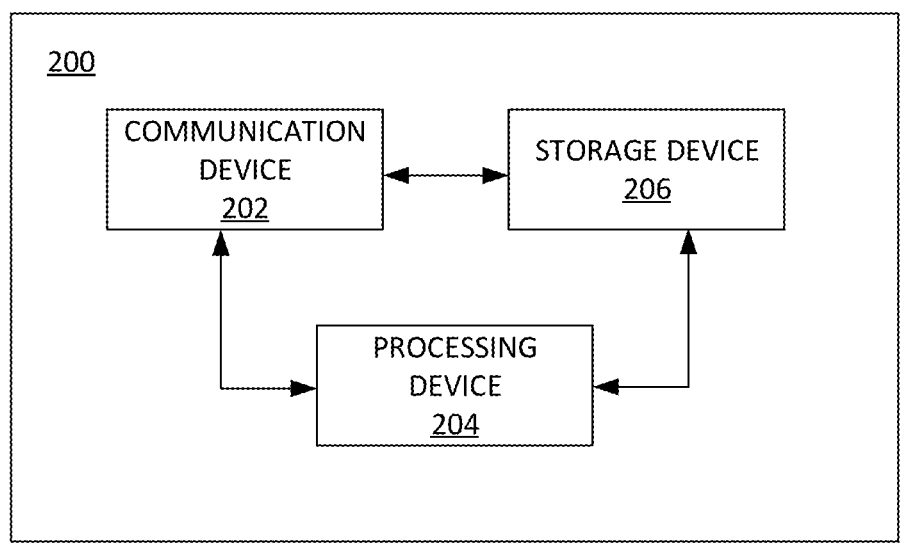
FIG. 2 illustrates a flow chart of a method of facilitating printing of a digital image based on image splitting, in accordance with some embodiments.

FIG. 2 is a block diagram of a system 200 for facilitating printing of a digital image based on image splitting in accordance with some embodiments. In general, the printing as disclosed herein, refers to any act of creating a temporary and/or a permanent indicium on a substrate. Further, in some embodiments, the printing may be performed by a printer such as, for example, but not limited to, a non-impact printer (e.g. inkjet printer, laser printer etc.) and an impact printer (e.g. dot matrix printer, line printer, drum printer, chain printer, band printer, daisy wheel printer etc.). Further, in some embodiments, the printer may be configured for printing using one or more of a material deposition technique and/or a material etching technique. Accordingly, in some embodiments, the printer may include a two-dimensional printer configured for printing over a surface and/or a three-dimensional printer configured for creating three dimensional objects.

The system 200 may include a communication device 202 configured for receiving the digital image from a user device. Further, the communication device 202 may be configured for transmitting a plurality of image segments to the user device.

Further, the system 200 may include a processing device 204 configured for analyzing the digital image. Further, the processing device 204 may be configured for determining at least one image characteristic based on the analyzing of the digital image. Further, the processing device 204 may be configured for generating the plurality of image segments based on the at least one image characteristic. Further, the system 200 may include a storage device 206 configured for storing the plurality of image segments.

In some embodiments, the user device may include a printer configured to print a plurality of indicia corresponding to the plurality of image segments onto the substrate.

In some embodiments, the substrate may include a transfer media configured to transfer the plurality of indicia corresponding to the plurality of image segments onto a surface.

In some embodiments, the processing device 204 may be further configured for generating a plurality of mirror image segments corresponding to the plurality of image segments.

In some embodiments, the transfer media may include a decal.

In some embodiments, the transfer media may be characterized by one or more of transparency and translucency.

In some embodiments, the transfer media may be further configured to transfer the plurality of indicia based on an application of energy.

In some embodiments, the at least one image characteristic may include a plurality of edges. Further, the generating of the plurality of image segments may be based on the plurality of edges.

In some embodiments, the processing device 204 may be further configured for identifying at least one splitting path based on the at least one image characteristic. Further, the generating of the plurality of image segments may be based on the at least one splitting path.

In some embodiments, a splitting path of the at least one splitting path does not cross itself.

In some embodiments, a length of a splitting path of the at least one splitting path may be shortest among a plurality of lengths of a plurality of potential splitting paths.

In some embodiments, the communication device 202 may be further configured for receiving at least one color indication from the user device. Further, the identifying of the at least one splitting path may be based on the at least one color indication.

In some embodiments, the at least one color indication designates one or more of at least one background color and at least one transparent color which may be a non-printing color. Further, the at least one splitting path traverses one or more image regions of the digital image corresponding to one or more of the at least one back the plurality of devices ground color and the at least one transparent color.

In some embodiments, the communication device 202 may be further configured for receiving at least one overlapping zone indication designating at least one overlapping zone in the digital image. Further, the at least one splitting path traverses one or more image regions of the digital image corresponding to the at least one overlapping zone.

In some embodiments, the processing device 204 may be further configured for applying a raster masking function to a digital image in order to create at least one printing area and at least one non-printing area. Further, the at least one splitting path traverses the at least one nonprinting area.

In some embodiments, a size of the digital image may be larger than a maximum printable area corresponding to the printer. Further, the system 200 further may include receiving a printable area indication representing the maximum printable area from the user device.

In some embodiments, the communication device 202 may be further configured for receiving at least one image segment size indication from the user device. Further, the generating of the plurality of image segments may be further based on the at least one image segment size indication. Further, a segment size of an image segment may be approximately equal to a corresponding size indication.

In some embodiments, the communication device 202 may be further configured for receiving at least one printer characteristic from the user device. Further, the processing device 204 may be configured for determining at least one optimum orientation corresponding to the plurality of image segments and rotating at least one image segment of the plurality of image segments based on the at least one optimum orientation.

In some embodiments, the communication device 202 may be further configured for receiving a feedback from the user device. Further, the generating all the plurality of image segments may be further based on the feedback.

In some embodiments, the processing device 204 may be further configured for generating a plurality of alignment indicators corresponding to the plurality of image segments. Further, an alignment indicator corresponding to an image segment may be configured to facilitate alignment of the image segment with at least one other image segment of the plurality of image segments on a substrate to recreate a representation of the digital image. Further, the processing device 204 may be configured for embedding the plurality of alignment indicators in the plurality of image segments.

Figure 3:
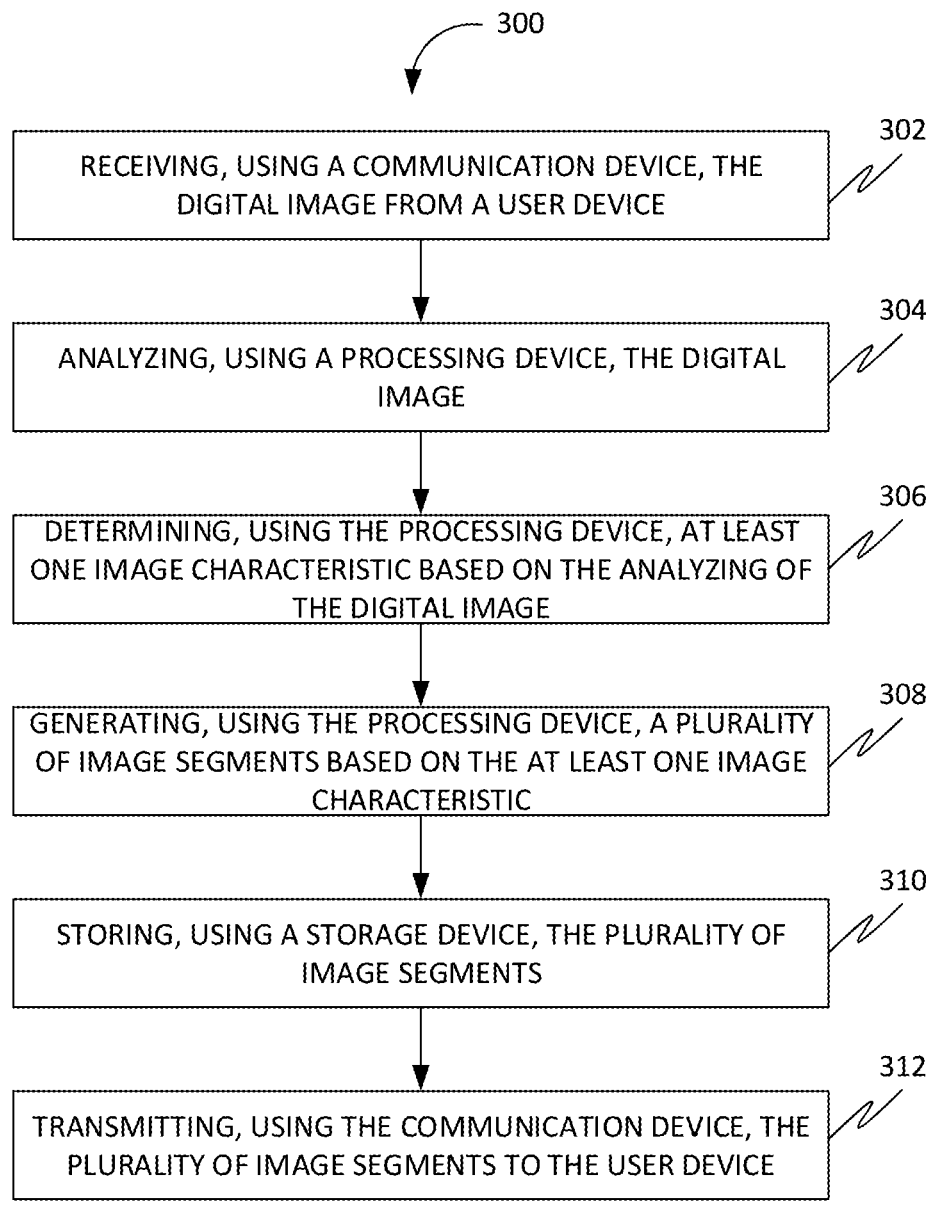
FIG. 3 is a flowchart of a method of facilitating printing of a digital image based on image splitting in accordance with some embodiments.

FIG. 3 is a flowchart of a method 300 of facilitating printing of a digital image based on image splitting in accordance with some embodiments. In general, the printing as disclosed herein, refers to any act of creating a temporary and/or a permanent indicium on a substrate. Further, in some embodiments, the printing may be performed by a printer such as, for example, but not limited to, a non-impact printer (e.g. inkjet printer, laser printer etc.) and an impact printer (e.g. dot matrix printer, line printer, drum printer, chain printer, band printer, daisy wheel printer etc.). Further, in some embodiments, the printer may be configured for printing using one or more of a material deposition technique and/or a material etching technique. Accordingly, in some embodiments, the printer may include a two-dimensional printer configured for printing over a surface and/or a three-dimensional printer configured for creating three dimensional objects.

At 302, the method 300 may include receiving, using a communication device (such as the communication device 202), the digital image from a user device.

In some embodiments, the user device may include a printer configured to print a plurality of indicia corresponding to the plurality of image segments onto the substrate. In further embodiments, the substrate may include a transfer media configured to transfer the plurality of indicia corresponding to the plurality of image segments onto a surface. In some embodiments, the method 300 may further include generating, using the processing device, a plurality of mirror image segments corresponding to the plurality of image segments. The transfer media may include a decal. Further, the transfer media may be characterized by one or more of transparency and translucency. In some embodiments, the transfer media may be further configured to transfer the plurality of indicia based on application of energy.

Further, at 304, the method 300 may include analyzing, using a processing device (such as the processing device 204), the digital image.

Further, at 306, the method 300 may include determining, using the processing device, at least one image characteristic based on the analyzing of the digital image. In some embodiments, the at least one image characteristic may include a plurality of edges. Further, the generating of the plurality of image segments may be based on the plurality of edges.

Further, at 308, the method 300 may include generating, using the processing device, a plurality of image segments based on the at least one image characteristic.

Further, at 310, the method 300 may include storing, using a storage device (such as the storage device 206), the plurality of image segments.

Further, at 312, the method 300 may include transmitting, using the communication device, the plurality of image segments to the user device.

In some embodiments, the method 300 may further include identifying, using the processing device, at least one splitting path based on the at least one image characteristic. Further, the generating of the plurality of image segments may be based on the at least one splitting path. In some embodiments, a splitting path of the at least one splitting path does not cross itself. Further, in some embodiments, a length of a splitting path of the at least one splitting path may be shortest among a plurality of lengths of a plurality of potential splitting paths.

In further embodiments, the method 300 may include receiving, using the communication device, at least one color indication from the user device. Further, the identifying of the at least one splitting path may be based on the at least one color indication.

The at least one color indication may designate one or more of at least one background color and at least one transparent color which may be a non-printing color. Further, the at least one splitting path traverses one or more image regions of the digital image corresponding to one or more of the at least one back the plurality of devices ground color and the at least one transparent color.

In some embodiments, the method 300 may further include receiving, using the communication device, at least one overlapping zone indication designating at least one overlapping zone in the digital image. Further, the at least one splitting path traverses one or more image regions of the digital image corresponding to the at least one overlapping zone.

In some embodiments, the method 300 may further include applying, using the processing device, a raster masking function to a digital image in order to create at least one printing area and at least one non-printing area. Further, the at least one splitting path traverses the at least one nonprinting area.

In some embodiments, a size of the digital image may be larger than a maximum printable area corresponding to the printer. Further, the method 300 further may include receiving, using the communication device, a printable area indication representing the maximum printable area from the user device.

In some embodiments, the method 300 may further include receiving, using the communication device, at least one image segment size indication from the user device. Further, the generating of the plurality of image segments may be further based on the at least one image segment size indication. Further, a segment size of an image segment may be approximately equal to a corresponding size indication.

In some embodiments, the method 300 may further include receiving, using the communication device, a feedback from the user device. Further, the generating all the plurality of image segments may be further based on the feedback.

Figure 4:
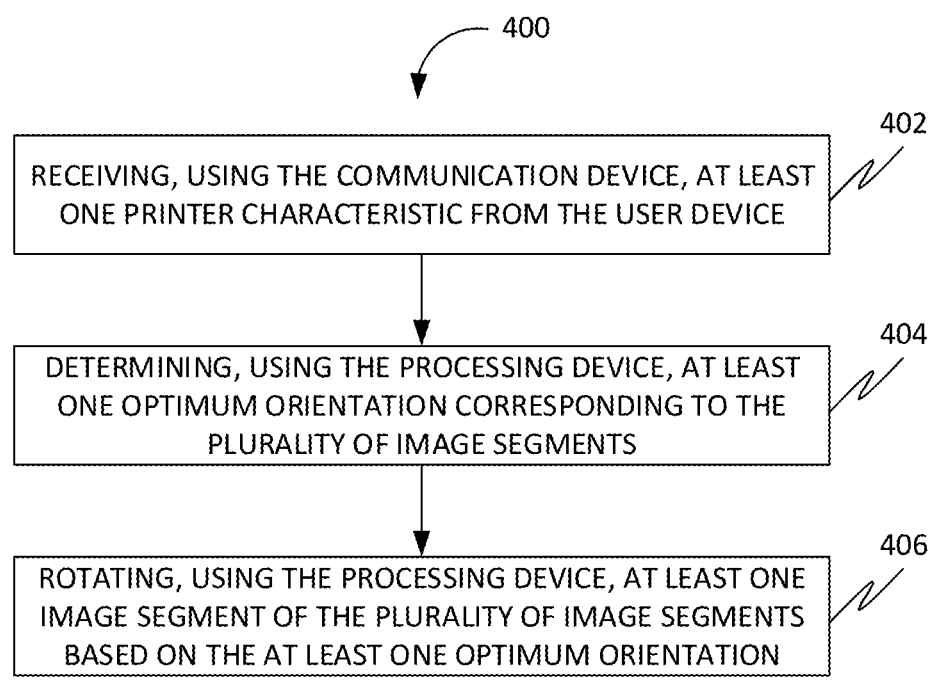
FIG. 4 is a flowchart of a method for adjusting an image segment, in accordance with some embodiments.

FIG. 4 is a flowchart of a method 400 for adjusting an image segment, in accordance with some embodiments. At 402, the method 400 may include receiving, using the communication device, at least one printer characteristic from the user device.

At 404, the method 400 may include determining, using the processing device, at least one optimum orientation corresponding to the plurality of image segments.

At 406, the method 400 may include rotating, using the processing device, at least one image segment of the plurality of image segments based on the at least one optimum orientation.

Figure 5:
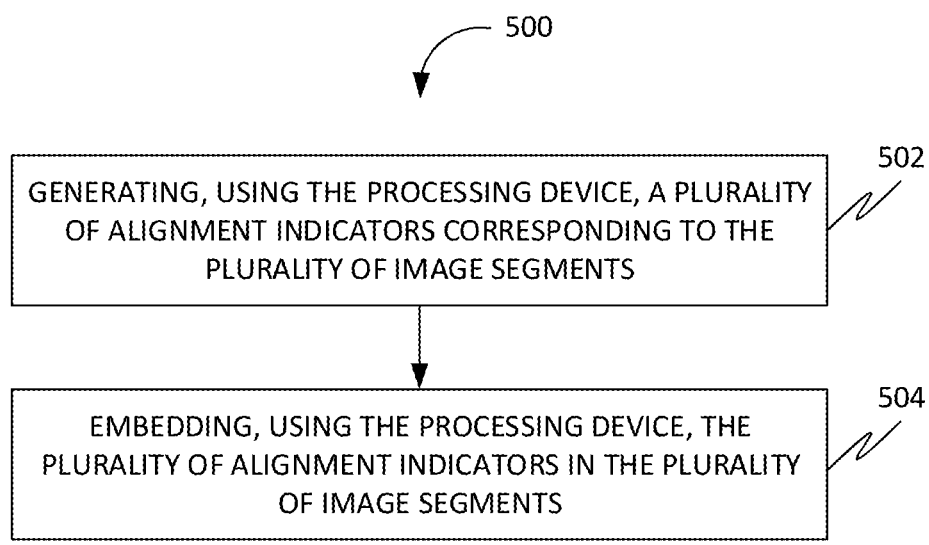
FIG. 5 is a flowchart of a method for obtaining an alignment indicator, in accordance with some embodiments.

FIG. 5 is a flowchart of a method 500 for obtaining an alignment indicator, in accordance with some embodiments. At 502, the method 500 may include generating, using the processing device, a plurality of alignment indicators corresponding to the plurality of image segments. Further, an alignment indicator corresponding to an image segment may be configured to facilitate alignment of the image segment with at least one other image segment of the plurality of image segments on a substrate to recreate a representation of the digital image. At 504, the method may include embedding, using the processing device, the plurality of alignment indicators in the plurality of image segments.

Figure 6:
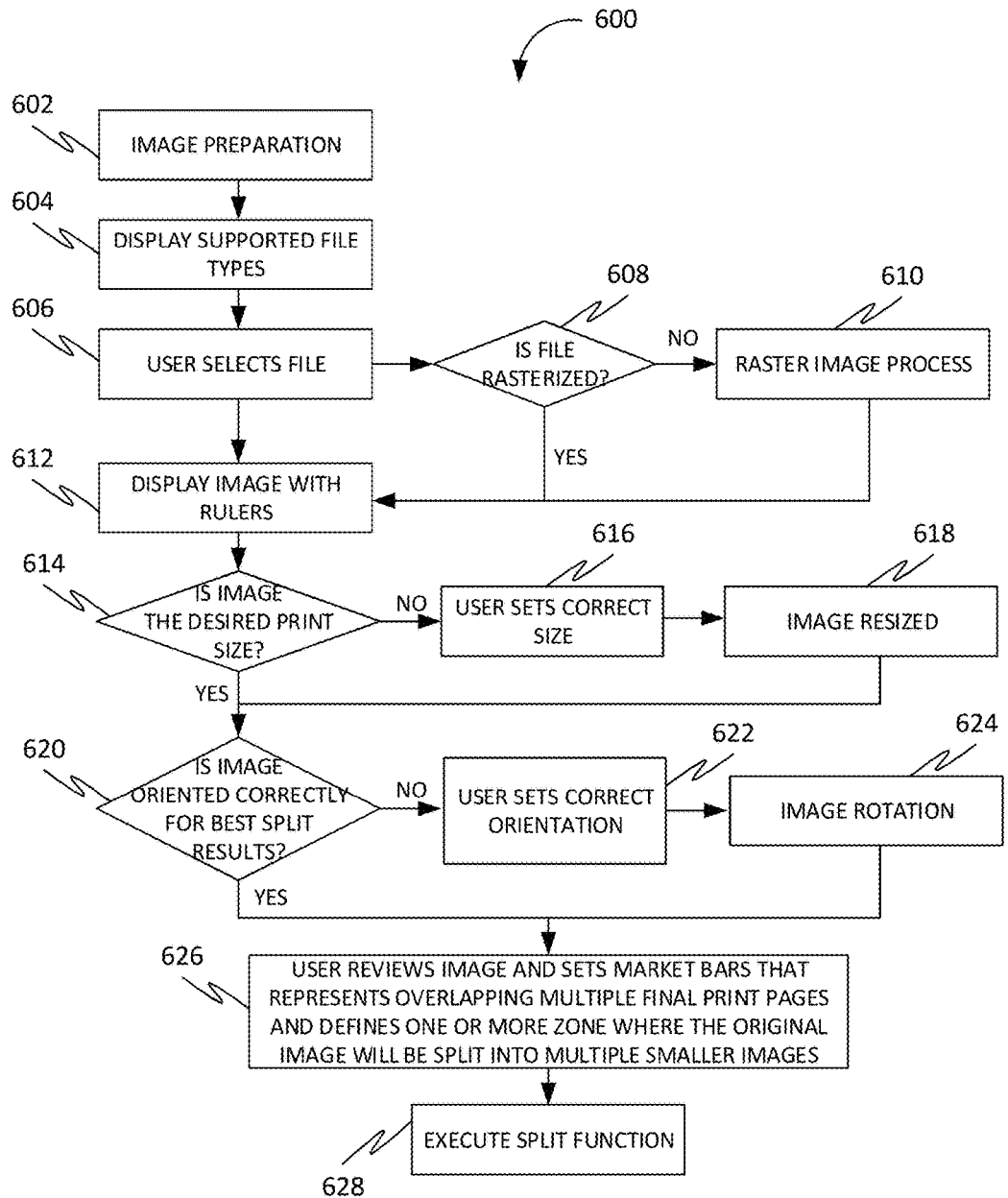
FIG. 6 is a flowchart of a method of processing images to prepare them for the splitting, in accordance with an embodiment.
Figure 10:
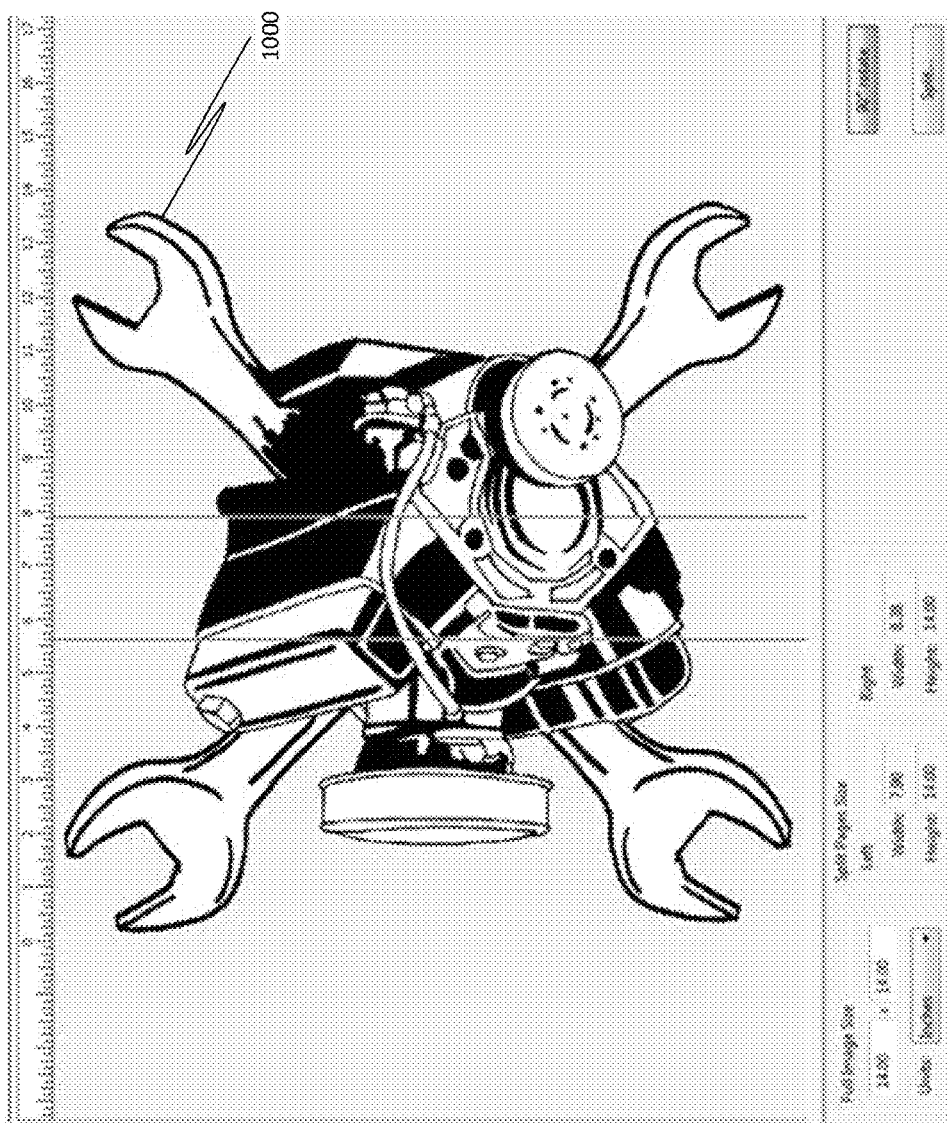
FIG. 10 illustrates setting up an image for splitting in accordance with an exemplary embodiment.

FIG. 6 is a flowchart of a method 600 of processing images to prepare them for the splitting, in accordance with an embodiment. The method 600 insures that the image data is in the correct format, at the correct size and orientation and enables the user to designate the desired zone for the split function to split the original image into multiple segments. FIG. 10 illustrates setting up an image 1000 for splitting in accordance with an exemplary embodiment.

At 602, the method 600 may include preparing image. At 604, the method 600 may include displaying supported file types. At 606, the method 600 may include a user selecting a file. At 608, the method 600 may include determining if the file is rasterized. If it is determined that the file is not rasterized, then at 610, the method 600 may include initiating a raster image process. However, at 608, if it is determined that the file is rasterized, then at 612, the method 600 may include displaying image with rulers. At 614, the method 600 may include determining if image is of the desired print size. If it is determined that the image is not of the desired print size, then at 616, the method 600 may include the user setting a correct size. At 618, the method 600 may include resizing image. However, at 614, if it is determined that the image is of the desired print size, then at 620, the method 600 may include determining if image is oriented correctly for best split results. If it is determined that the image is not oriented correctly, then at 622, the method 600 may include the user setting correct orientation. Then, at 624, the method 600 may include rotating image. However, at 620, if it is determined that the image is oriented correctly, then at 626, the method 600 may include the user reviewing image and setting market bars that represents overlapping multiple final print pages and defining one or more zone where the original image will be split into multiple smaller images. Then, at 628, the method 600 may include executing a split function.

Figure 7:
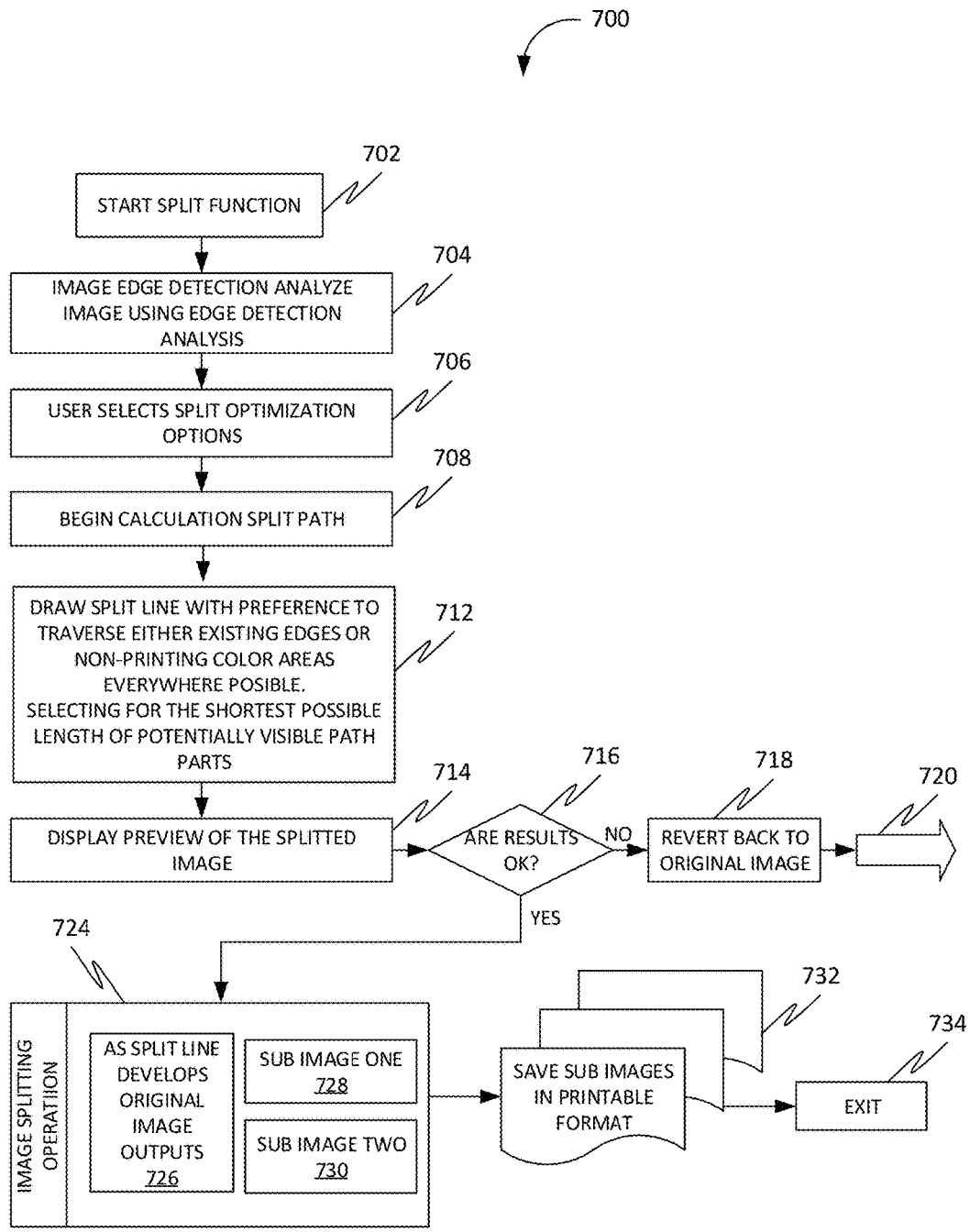
FIG. 7 is a flowchart of a method of splitting an image into sub-images, in accordance with an embodiment.
Figure 11:
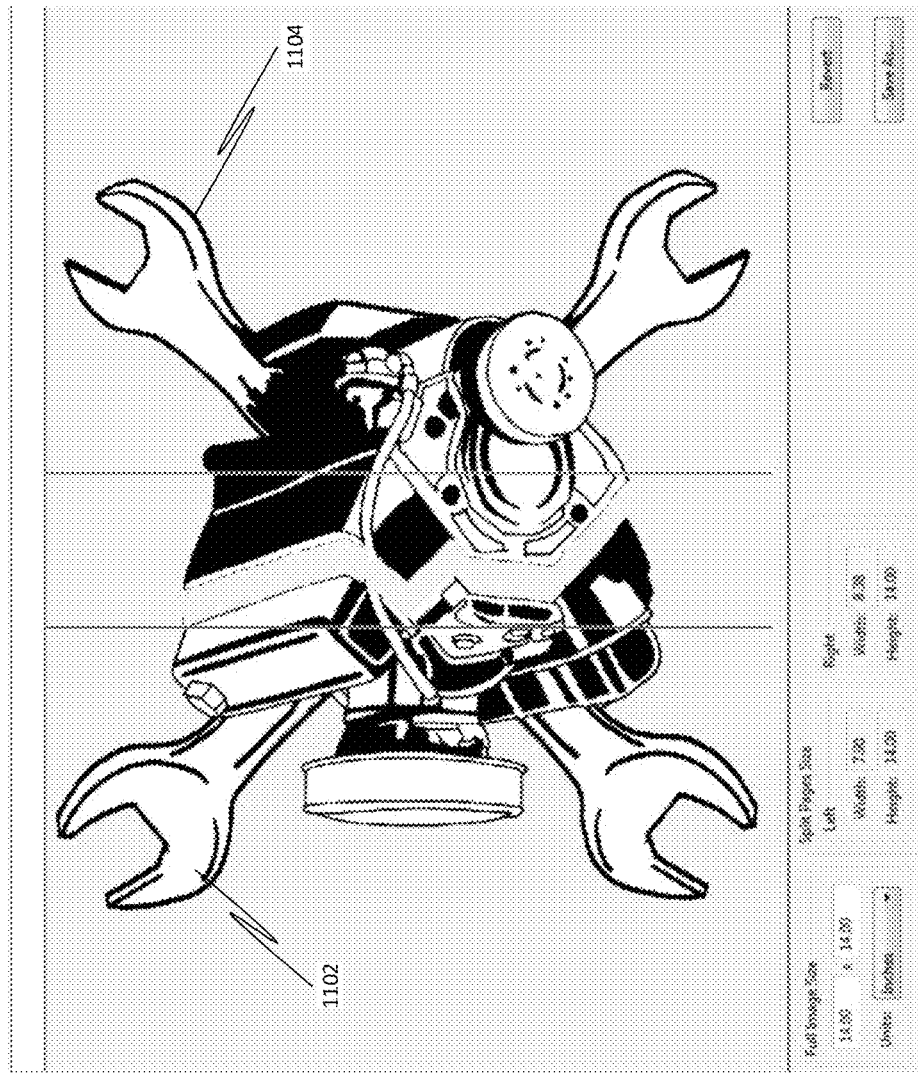
FIG. 11 illustrates sub-images after splitting the image of FIG. 10, in accordance with an exemplary embodiment.

FIG. 7 is a flowchart of a method 700 of splitting an image into sub-images, in accordance with an embodiment. FIG. 11 illustrates sub-images 1102-1104 after splitting the image 1000 of FIG. 10, in accordance with an exemplary embodiment.

At 702, the method 700 may include start the split function. At 704, the method 700 may include detecting edges in image by analyzing image using edge detection algorithms. At 706, the method 700 may include the user selecting split optimization options, such as black, white, etc. At 708, the method 700 may include beginning calculation split path. The split path is a continuous pat drawn from one side of the image to the opposite side that does not cross itself. At 712, the method 700 may include drawing split line with preference to traverse either existing edges or non-printing color areas everywhere possible. This may include selecting the shortest possible length of potentially visible path parts. At 714, the method 700 may include displaying a preview of the split image. At 716, the method 700 may include determining if the results are acceptable. If it is determined, the results are acceptable, then at 724, the method 700 may include executing image splitting operation. This may include developing a split line on the original image at 726, which may generate a sub-image one 728 and a sub-image one 730. At 732, the method 700 may include saving sub-images in printable format. At 734, the method 700 may exit or stop.

However, at 716, if it is determined, the results are not acceptable, then at 718, the method 700 may include reverting back to the original image. At 720, the method 700 may include going to start step 702.

Figure 8:
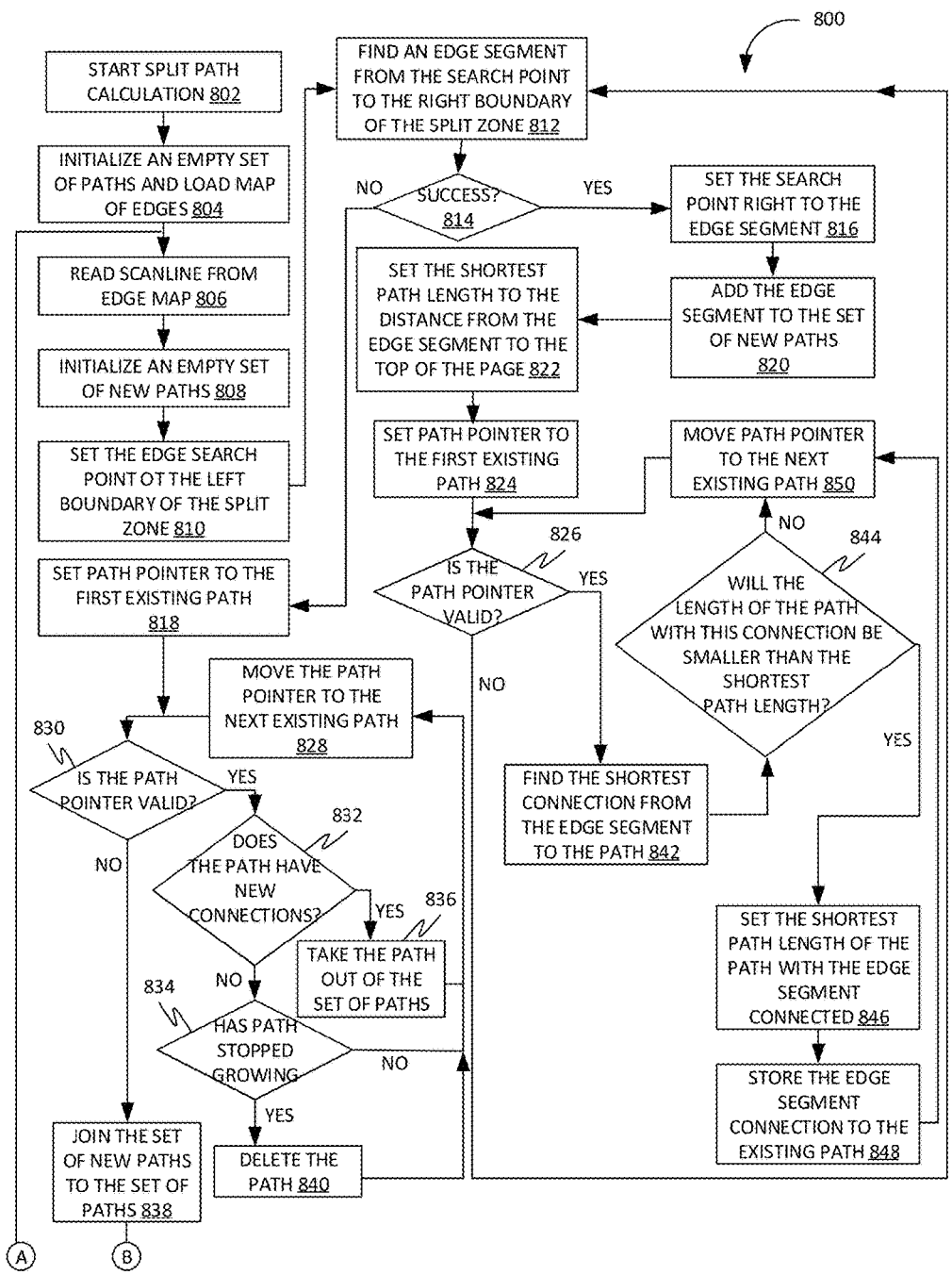
FIG. 8 is a flowchart of a method of splitting an image into sub-images, in accordance with an embodiment.
Figure 9:
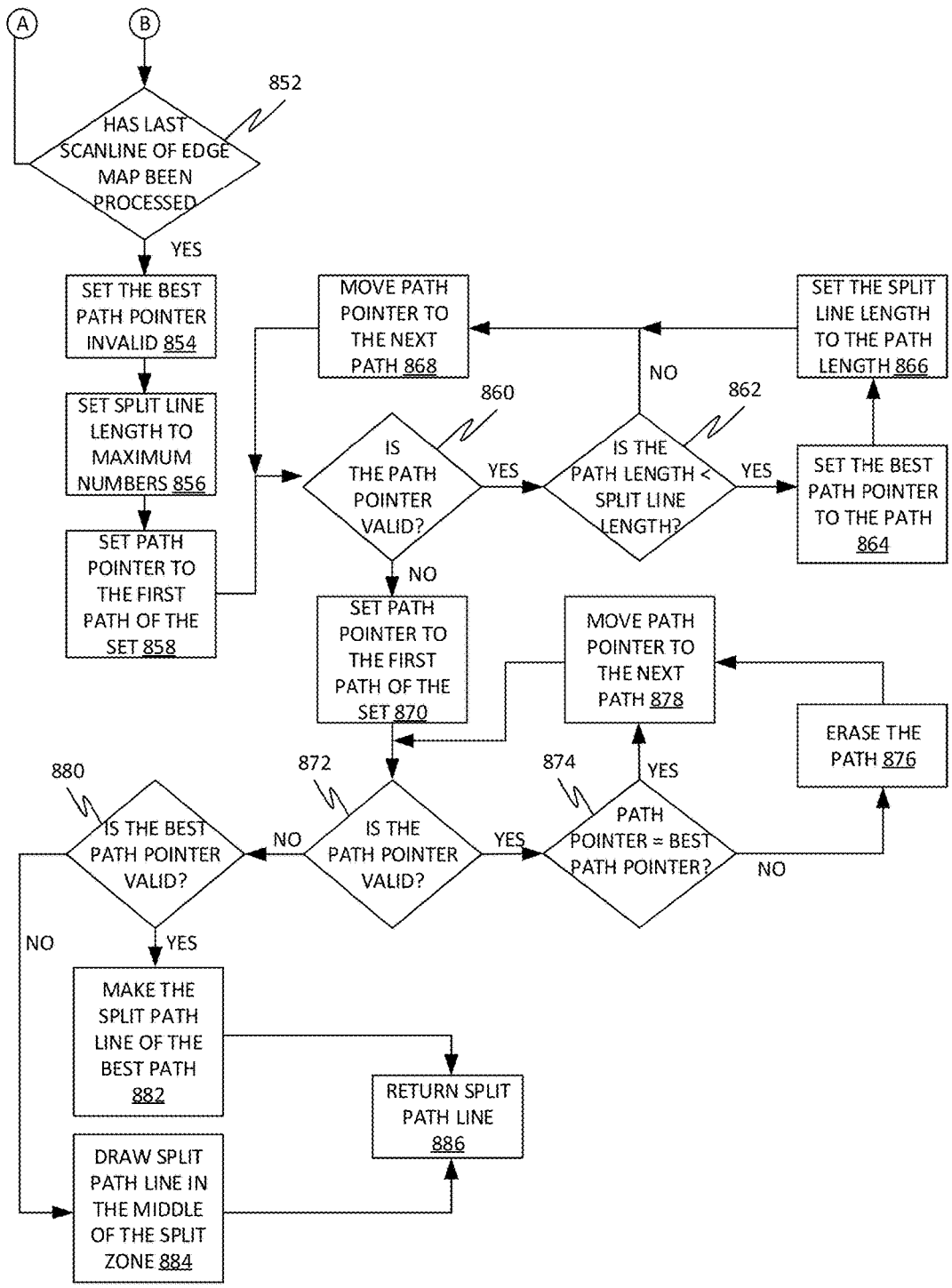
FIG. 9 is a continuation of the flowchart of FIG. 8.

FIGS. 8-9 show a flowchart of a method 800 of splitting image into sub-images, in accordance with an embodiment. At 802, the method 800 may include starting a split path calculation. At 804, the method 800 may include initializing an empty set of paths and load map of edges. At 806, the method 800 may include reading a scanline from edge map. At 808, the method 800 may include initializing an empty set of new paths. At 810, the method 800 may include setting the edge search point to the left boundary of the split zone. At 812, the method 800 may include finding an edge segment from the search point to the right boundary of the split zone. At 814, the method 800 may include determining if finding an edge segment is successful. If it is determined that the finding an edge segment is successful, then at 816, the method 800 may include setting the search point right to the edge segment. At 820, the method 800 may include adding the edge segment to the set of new paths. At 822, the method 800 may include setting the shortest path length to the distance from the edge segment to the top of the page. The distance is measured as the length of entirely visible straight line. Further, the distance and the length may consist of two numbers each: a primary value and a secondary value. The primary value may be calculated as the length of a line drawn or a distance measured in the area where the cut line would be potentially visible. Further, the secondary value may be calculated as the length of a line drawn along an image element edge or in non-printing area, that is, it represents the length of "invisible" part of a path. Further, when the two lengths are compared, the primary values are compared first. Then, the secondary values comparison is performed and has an effect if the primary values are equal.

At 824, the method 800 may include setting path pointer to the first existing path. Further, at 826, the method 800 may include determining if the path pointer is valid. If it is determined that the path pointer is valid, then the method 800 goes to step 812. However, if it is determined that the path pointer is not valid, then at 842, the method 800 may include finding the shortest connection from the edge segment to the path. Then, at 844, the method 800 may include determining if the length of the path with this connection is smaller than the shortest path length. If it is determined the length of the path with this connection is not smaller than the shortest path length, then the at 850, the method 800 may include moving the path pointer to the next existing path. However, if it is determined the length of the path with this connection is smaller than the shortest path length, then at 846, the method 800 may include setting the shortest path length of the path with the edge segment connected. At 848, the method 800 may include storing the edge segment connection to the existing path.

Further, at 814, if it is determined that the finding an edge segment is not successful, then at 818, the method 800 may include setting path pointer to the first existing path. At 830, the method 800 may include determining if the path pointer is valid. If it is determined that the path pointer is valid, then at 832, the method 800 may include determining if the path has new connections. If it is determined that the path has new connections then at 836, the method 800 may include taking the path out of the set of paths. However, if it is determined that the path does not have new connections then at 834, the method 800 may include determining if the path has stopped growing. If it is determined that the path has stopped growing, then at 840, the method 800 may include deleting the path. At 828, the method 800 may include moving the path pointer to the next existing path.

Further, at 830, if it is determined that the path pointer is not valid, then at 838, the method 800 may include joining the set of new paths to the set of paths.

At 852, the method 800 may include determining if the last scanline of edge map has been processed. If it is determined that the last scanline of edge map has been processed, then at 854, the method 800 may include setting the best path pointer to invalid. At 856, the method 800 may include setting split line length to maximum numbers. At 858, the method 800 may include setting path pointer to the first path of the set. Then, at 860, the method 800 may include determining if the path pointer is valid. If it is determined that the path pointer is valid, then at 862, the method 800 may include determining if the path length split line is less than the split line length. If it is determined that the path length split line is less than the split line length, then at 864, the method 800 may include setting the best path pointer to the path pointer. At 866, the method 800 may include setting the split line length to the path length. At 868, the method 800 may include moving path pointer to the next path.

However, at 860, if it is determined that the path pointer is not valid, then at 870, the method 800 may include setting path pointer to the first path of the set. Then, at 872, the method 800 may include determining if the path pointer is valid. If it is determined that the path pointer is valid, then at 874, the method 800 may include determining if path pointer is the best path pointer. If it is determined that the path pointer is not the best path pointer, then at 876, the method 800 may include erasing the path. If it is determined that the path pointer is the best path pointer, then at 878, the method 800 may include moving path pointer to the next path.

However, at 872, if it is determined that the path pointer is not valid, then at 880, the method 800 may include determining if the best path pointer is valid. If it is determined that the best path pointer is valid, then at 882, the method 800 may include making the split path line of the best path. If it is determined that the best path pointer is not valid, then at 884, the method 800 may include drawing split path line in the middle of the split zone. Finally, at 886, the method 800 may include returning split path line.

Figure 12:
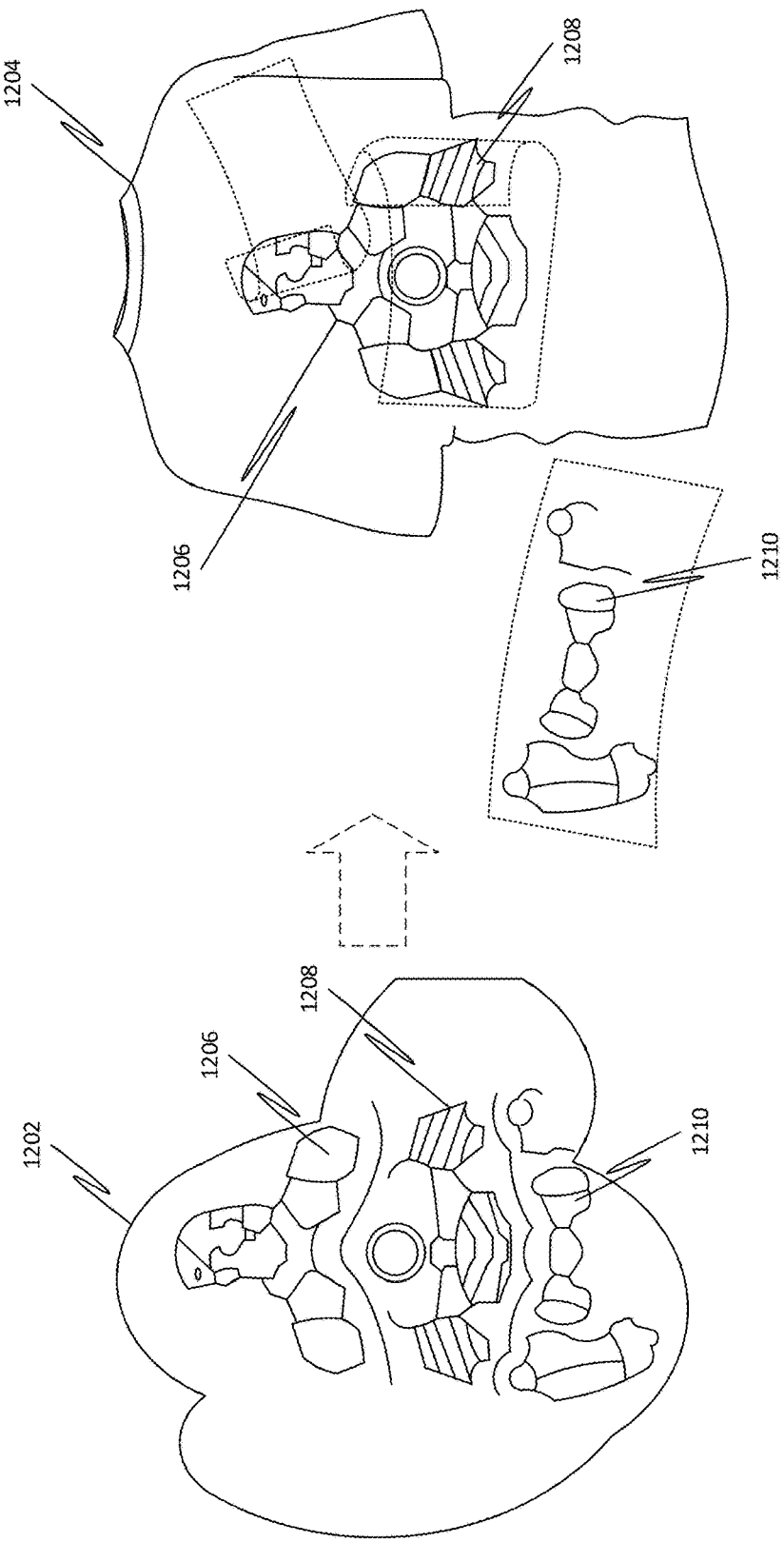
FIG. 12 illustrates an image printed on a translucent media being applied to a garment, in accordance with an exemplary embodiment.

FIG. 12 illustrates an image printed on a translucent media 1202 being applied to a garment 1204, in accordance with an exemplary embodiment. The image may include three image segments 1206-1210. For example, the method 300 may be used to analyze the image, determine at least one image characteristic based on the analyzing of the image, and generating, the image segments 1206-1210 based on the at least one image characteristic. Thereafter, the image segments 1206-1210 may be printed on the translucent media 1202.

Further, the image segments 1206-1210 may be removed one-by-one from the translucent media 1202 and then seamlessly applied to the garment 1204.

Figure 13:
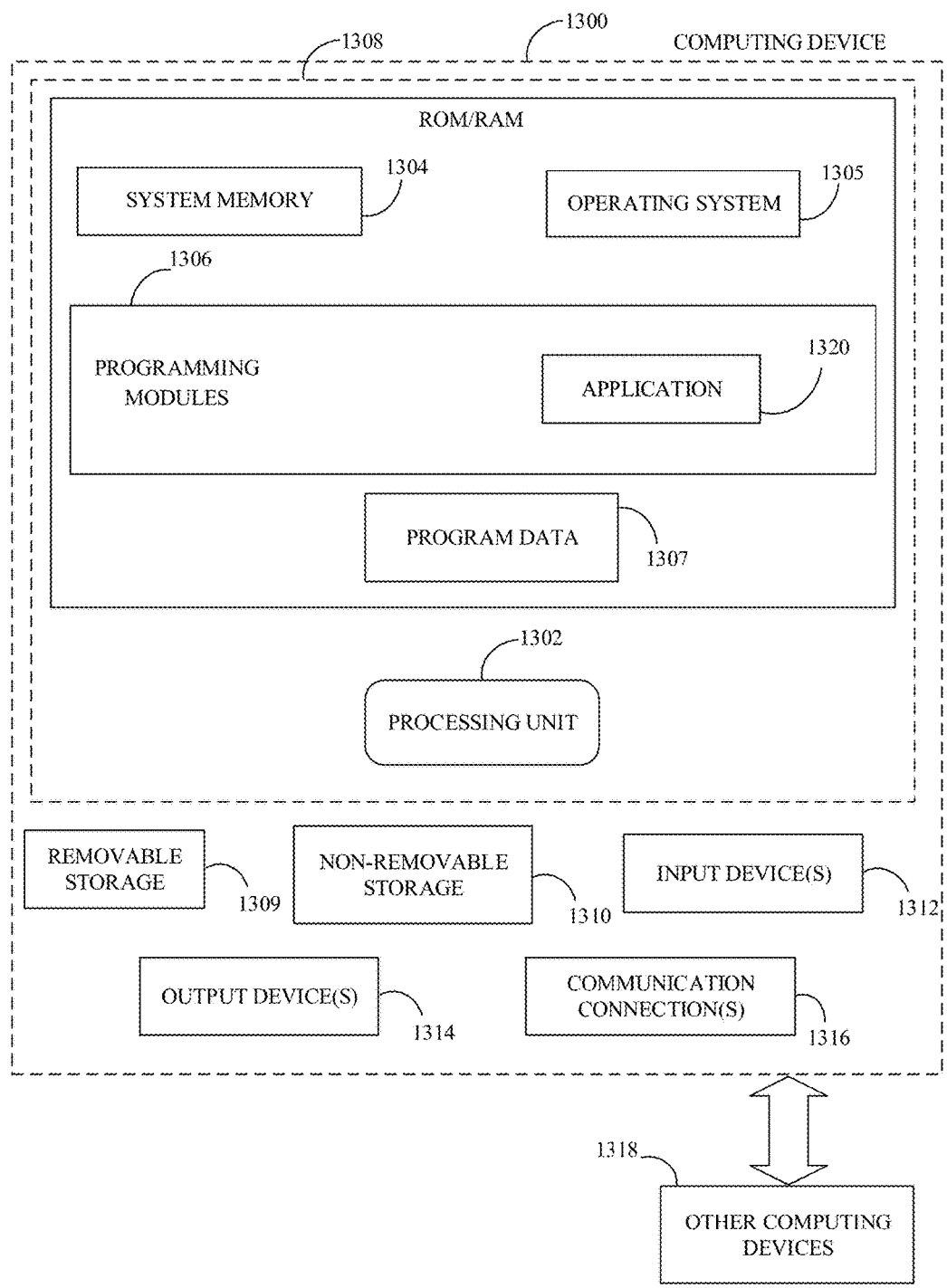
FIG. 13 illustrates a block diagram of a computing device configured for facilitating printing of a digital image based on image splitting, in accordance with some embodiments.

With reference to FIG. 13, a system consistent with an embodiment of the disclosure may include a computing device or cloud service, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random-access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, a location sensor, a camera, a biometric sensor, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., application 1320 such as a media player) may perform processes including, for example, one or more stages of methods, algorithms, systems, applications, servers, databases as described above. The aforementioned process is an example, and processing unit 1302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

Although the invention has been explained in relation to its preferred embodiment, it is to be understood that many other possible modifications and variations can be made without departing from the spirit and scope of the invention as hereinafter claimed.

What is claimed is:

1. A method of recreating an original image design by splitting a digital image based on a combination of edge analysis and non-printing color analysis, digitally printing the image segments, and reassembling the image segments, the method comprising:
   receiving, using a communication device, the digital image from a user device;
   analyzing, using a processing device and edge detection algorithms, the digital image;
   determining, using the processing device or a user input, certain overlap zones designated as splitting zones;
   generating, using the processing device, one or more edge paths comprising an edges map of the splitting zones;
   determining, a plurality of paths based on non-printing colors;
   determining, a plurality of paths based on transparent colors;
   generating, a splitting path consisting of one or more edge paths, and/or non-printing color paths, and/or transparent color paths;
   generating, using the processing device, a plurality of image segments based on splitting the digital image at the point of intersection of the generated splitting path;
   storing, using a storage device, the plurality of image segments;
   printing such image segments using conventional imaging methods to a substrate;
   aligning each printed image segment such that the splitting path will be correctly placed as per the original image;
   bonding the image segments in such a fashion that a produced result is as visually acceptable as the original image.

2. The method of claim 1, wherein the at least one image characteristic comprises a user defined split zone, wherein the generating of the plurality of image segments is based on selecting the optimal splitting path inside this zone.

3. The method of claim 1 further comprising identifying, using the processing device, at least one splitting path based on the at least one image characteristic, wherein the length of a splitting path of the at least one splitting path is shortest among a plurality of lengths of a plurality of potential splitting paths.

4. The method of claim 3 further comprising receiving, using the communication device, at least one color indication from the user device, wherein the identifying of the at least one splitting path traverses the at least one color indication.

5. The method of claim 4, wherein the at least one color indication designates one or more background colors and/or one or more transparent colors which are non-printing colors, wherein the at least one splitting path traverses one or more image regions of the digital image corresponding to one or more of the background colors and/or the transparent colors.

6. The method of claim 3 further comprising receiving, using the communication device, at least one overlapping zone indication designating at least one overlapping zone in the digital image, wherein the at least one splitting path traverses one or more image regions of the digital image corresponding to the at least one overlapping zone.

7. The method of claim 1 further comprising receiving, using the communication device, at least one image segment size indication from the user device, wherein the generating of the plurality of image segments is further based on overlapping zones using the at least one image segment size indication, wherein a segment size of an image segment is approximately equal to a corresponding size indication.

8. The method of claim 1 further comprising:
receiving, using the communication device, at least one printer characteristic from the user device;
determining, using the processing device, at least one optimum orientation corresponding to the plurality of image segments; and
rotating, using the processing device, at least one image segment of the plurality of image segments based on the at least one optimum orientation.

9. The method of claim 1 further comprising:
generating, using the processing device, a plurality of alignment indicators corresponding to the plurality of image segments, wherein an alignment indicator corresponding to an image segment is configured to facilitate alignment of the image segment with at least one other image segment of the plurality of image segments on a substrate to recreate a representation of the digital image; and
embedding, using the processing device, the plurality of alignment indicators in the plurality of image segments.

10. The method of claim 9, wherein the alignment indicators are stored as digital positioning information and transferred in a digital fashion to an automated system for assembling the original image design.

11. A system for facilitating printing and reassembling a digital image based on image splitting, the system comprising:
a processing system configured to produce image segments based on the method of claim 1;
a printing device configured for:
loading translucent printing media; and
printing a plurality of image segments to the translucent media;
and
a transfer application mechanism configured for:
application of adhesives as used in the trade for image transfer;
application of the printed image to some substrate using methods such as heat transfer;
alignment of image segments through visual inspection enabled by the translucent media;
continued alignment and application of image segments to produce a final original design.

12. The system of claim 11, wherein the printing device is configured for:
deposit based printing;
printing a plurality of image segments to some substrate; and
application of a bonding component while assembling each segment into a final original design.

13. The system of claim 11, wherein the use of alignment methods involve the reading of alignment indicators and positioning the transfer media in an automated fashion to produce a final original design.

* * * * *